(12) United States Patent
High et al.

(10) Patent No.: US 11,401,034 B2
(45) Date of Patent: Aug. 2, 2022

(54) DRONE DELIVERY SYSTEM HAVING A SINGLE USE LOWERING LINE

(71) Applicant: Walmart Apollo, LLC, Bentonville, AR (US)

(72) Inventors: Donald R. High, Noel, MO (US); John J. O'Brien, Farmington, AR (US); Robert Cantrell, Herndon, VA (US); Brian Mchale, Oldham (GB); Justin Schuhardt, Montara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 674 days.

(21) Appl. No.: 16/281,683

(22) Filed: Feb. 21, 2019

(65) Prior Publication Data

US 2019/0263523 A1 Aug. 29, 2019

Related U.S. Application Data

(60) Provisional application No. 62/636,678, filed on Feb. 28, 2018.

(51) Int. Cl.
*B64D 1/12* (2006.01)
*B64C 39/02* (2006.01)
(Continued)

(52) U.S. Cl.
CPC .............. *B64D 1/12* (2013.01); *B64C 39/024* (2013.01); *G06Q 10/08* (2013.01); *G08G 5/0021* (2013.01);
(Continued)

(58) Field of Classification Search
CPC .... B64D 1/00; B64D 1/02; B64D 1/12; B64C 39/024; B64C 2201/128; B64C 2201/146; G06Q 10/08
See application file for complete search history.

(56) References Cited

U.S. PATENT DOCUMENTS 9,174,733 B1 * 11/2015 Burgess .................. B64D 1/12
9,290,269 B2    3/2016 Walker et al.
(Continued)

FOREIGN PATENT DOCUMENTS

WO         2017029611 A1      2/2017
WO    WO-2017204892 A1 *  11/2017    ......... B64C 39/024
WO    WO-2018223031 A  *  12/2018    ............. B64D 1/10

*Primary Examiner* — Benjamin P Lee
(74) *Attorney, Agent, or Firm* — Duane Morris LLP; Manita Rawat

(57) ABSTRACT

An aerial vehicle for delivering a package. The aerial vehicle having a package deployment system coupled to the aerial vehicle. The package deployment system having a spool coupled to the aerial vehicle, a lowering line fixedly coupled to the spool at a first end, the lowering line having a second end secured to a grasping device, and a cutting device coupled to one of the spool or the lowering line. The aerial vehicle also having a package coupled to the grasping device and a monitoring system couple to one of the aerial vehicle or the package deployment system. The package deployment system is configured to deliver the package at a delivery location. The cutting device is configured to sever the lowering line to deliver the package. A method for delivering a package with an aerial vehicle having the package deployment system.

18 Claims, 4 Drawing Sheets

(51) Int. Cl.
*G08G 5/00* (2006.01)
*G08G 5/02* (2006.01)
*G06Q 10/08* (2012.01)

(52) U.S. Cl.
CPC ........... *G08G 5/0069* (2013.01); *G08G 5/025* (2013.01); *B64C 2201/128* (2013.01); *B64C 2201/146* (2013.01)

(56) References Cited

U.S. PATENT DOCUMENTS

| | | | |
|---|---|---|---|
| 9,302,770 B2 | 4/2016 | Burgess et al. | |
| 9,321,531 B1* | 4/2016 | Takayama | B64C 39/024 |
| 9,346,547 B2* | 5/2016 | Patrick | B64C 39/024 |
| 9,422,139 B1* | 8/2016 | Bialkowski | B64C 39/024 |
| 9,493,238 B2* | 11/2016 | Takayama | B64D 1/22 |
| 9,536,216 B1 | 1/2017 | Lisso | |
| 9,580,173 B1* | 2/2017 | Burgess | B64D 1/22 |
| 9,630,715 B2* | 4/2017 | Takayama | B64D 1/12 |
| 9,650,136 B1* | 5/2017 | Haskin | B64C 39/024 |
| 9,676,481 B1* | 6/2017 | Buchmueller | B64D 1/02 |
| 9,688,404 B1* | 6/2017 | Buchmueller | G06Q 10/083 |
| 9,969,494 B1* | 5/2018 | Buchmueller | G05D 1/0858 |
| 9,975,651 B1* | 5/2018 | Eck | B65G 67/04 |
| 9,981,834 B2* | 5/2018 | Bialkowski | G05D 1/0858 |
| 10,071,804 B1* | 9/2018 | Buchmueller | B64D 1/08 |
| 10,131,437 B1* | 11/2018 | Hanlon | G06Q 10/083 |
| 10,266,266 B2* | 4/2019 | Sopper | B66D 5/026 |
| 10,293,938 B2* | 5/2019 | Thompson | B64D 1/22 |
| 10,301,020 B2* | 5/2019 | Jones | B64C 39/024 |
| 10,301,021 B2* | 5/2019 | Jones | B64C 39/024 |
| 10,545,500 B2* | 1/2020 | Schubert | G06N 3/04 |
| 10,618,655 B2* | 4/2020 | Rinaldi | B65D 81/3825 |
| 10,647,508 B2* | 5/2020 | Eck | B65G 1/0464 |
| 10,689,113 B2* | 6/2020 | Prager | G05D 1/0094 |
| 10,696,395 B2* | 6/2020 | Molnar | G09F 13/00 |
| 10,814,980 B2* | 10/2020 | Zvara | A01C 7/042 |
| 10,916,151 B2* | 2/2021 | Mulhall | G08G 5/0013 |
| 10,974,831 B2* | 4/2021 | Prager | B64C 39/024 |
| 2010/0132955 A1* | 6/2010 | Storm, Jr | E21B 47/01 166/377 |
| 2015/0041598 A1* | 2/2015 | Nugent | B64C 39/022 244/53 R |
| 2015/0158587 A1* | 6/2015 | Patrick | B64D 1/22 244/137.4 |
| 2016/0068264 A1* | 3/2016 | Ganesh | G05D 1/0676 701/2 |
| 2016/0096623 A1* | 4/2016 | Duffy | B64C 39/024 244/118.1 |
| 2016/0239798 A1* | 8/2016 | Borley | G06Q 10/08355 |
| 2016/0244165 A1* | 8/2016 | Patrick | B64D 1/12 |
| 2017/0043871 A1* | 2/2017 | Takayama | B64D 1/02 |
| 2017/0081028 A1* | 3/2017 | Jones | B64C 39/024 |
| 2017/0081029 A1* | 3/2017 | Jones | B64C 39/024 |
| 2017/0247109 A1* | 8/2017 | Buchmueller | B64C 39/024 |
| 2017/0253334 A1* | 9/2017 | Takayama | B64D 1/12 |
| 2017/0253335 A1* | 9/2017 | Thompson | B64C 39/024 |
| 2017/0267347 A1* | 9/2017 | Rinaldi | B64D 17/80 |
| 2017/0280678 A1* | 10/2017 | Jones | B64C 39/024 |
| 2017/0334561 A1* | 11/2017 | Sopper | B64D 1/22 |
| 2018/0039286 A1* | 2/2018 | Tirpak | B64F 1/00 |
| 2018/0072404 A1* | 3/2018 | Prager | B64D 1/12 |
| 2018/0072418 A1* | 3/2018 | Shannon | B64D 1/22 |
| 2019/0043370 A1* | 2/2019 | Mulhall | B64D 1/08 |
| 2019/0100314 A1* | 4/2019 | Prager | B64D 1/22 |
| 2019/0193856 A1* | 6/2019 | Prager | B66C 1/425 |
| 2019/0202562 A1* | 7/2019 | Sopper | B66D 5/026 |
| 2019/0235527 A1* | 8/2019 | O'Brien | G05D 1/0204 |
| 2019/0248490 A1* | 8/2019 | Jones | B64C 39/024 |
| 2019/0263523 A1* | 8/2019 | High | B64D 17/00 |
| 2020/0046156 A1* | 2/2020 | Holzer | H04L 63/0442 |
| 2020/0062399 A1* | 2/2020 | Prager | B64C 39/024 |
| 2020/0094962 A1* | 3/2020 | Sweeny | B64D 1/02 |
| 2020/0207471 A1* | 7/2020 | Yasuda | B64C 27/08 |
| 2020/0207474 A1* | 7/2020 | Foggia | G05D 1/0676 |
| 2020/0277058 A1* | 9/2020 | Prager | B66C 1/425 |
| 2021/0253251 A1* | 8/2021 | Pass | B64C 39/024 |

* cited by examiner

DRONE DELIVERY SYSTEM HAVING A SINGLE USE LOWERING LINE

CROSS REFERENCE TO RELATED APPLICATIONS

This present Patent Applications claims priority benefit from U.S. Provisional Patent Application No. 62/636,678 filed on Feb. 28, 2018, the entire content of which is hereby incorporated herein by reference.

TECHNICAL FIELD OF THE INVENTION

The present application relates to a package deployment system for delivering a package from an aerial vehicle. More specifically, the present application relates to a crane having a single use lowering line for delivering a package.

BACKGROUND OF THE INVENTION

Aerial vehicles, such as unmanned aerial vehicles, have become increasingly popular for retail package delivery and for delivery of packages to difficult or remote locations. Currently, delivery of the packages is performed by spooling out a cable or line with the package coupled to a distal end with a claw or other grabbing device. The package is released and the cable is again spooled or left extended as the aerial vehicle returns to a home base, warehouse, or factory location. Therefore, a need exists for improved systems for coupling and releasing lines after package delivery. A need exists for a lowering line which may be detached from the aerial vehicle and left with the package.

BRIEF SUMMARY OF THE INVENTION

According to an embodiment of the present disclosure, an aerial vehicle for delivering a package may include a package deployment system coupled to the aerial vehicle, a package coupled to the grasping device; and a monitoring system couple to one of the aerial vehicle or the package deployment system. The package deployment system may include a spool coupled to the aerial vehicle; a lowering line fixedly coupled to the spool at a first end, the lowering line having a second end secured to a grasping device; and a cutting device coupled to one of the spool or the lowering line. The package deployment system is configured to deliver the package at a delivery location by actuating the cutting device to sever the lowering line to deliver the package, the severed lowering line having a first portion coupled to the spool and a second portion coupled to the package. The spool is configured to spool the first portion of the lowering line before navigating to another location.

According to an embodiment of the present disclosure, a method for delivering a package with an aerial vehicle may include loading a package on a package deployment system of the aerial vehicle; navigating the aerial vehicle to a delivery location; monitoring a parameter of the aerial vehicle or the package deployment system; severing a lowering line secured to the package into a first portion coupled to the aerial vehicle and a second portion coupled to the package, the severing based on a signal indicative of the parameter being within a predetermined threshold; releasing the second portion of the lowering line and the package to be delivered to the delivery location; and spooling the first portion of the lower ling before navigating to another location.

BRIEF DESCRIPTION OF DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. A person skilled in the relevant art would recognize that other equivalent parts can be employed and other methods developed without departing from the spirit and scope of the invention. All references cited herein are incorporated by reference as if each had been individually incorporated.

The present disclosure relates to an aerial vehicle having a package delivery system. The package delivery system may include a lowering line, a lowering line spool, a monitoring system, a lowering line cutting device, and a spool brake. The package delivery system may be actuated to deliver the package based on information relayed to the aerial vehicle. The aerial vehicle may send a signal to a component of the package delivery system to activate the line cutting device associated with the lowering line to cut the lowering line to deliver the package.

Figure 1:
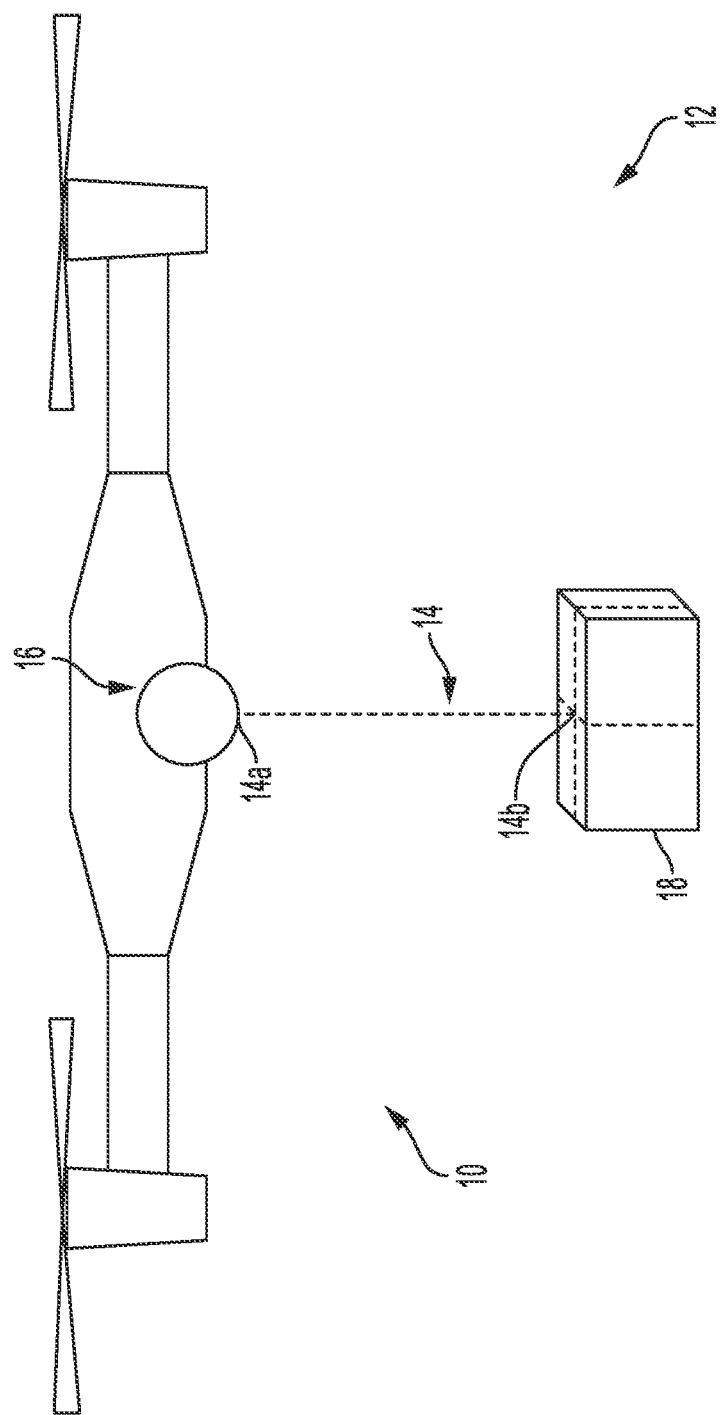
FIG. 1 shows a schematic view of an aerial vehicle, according to an embodiment of the present disclosure.
Figure 2:
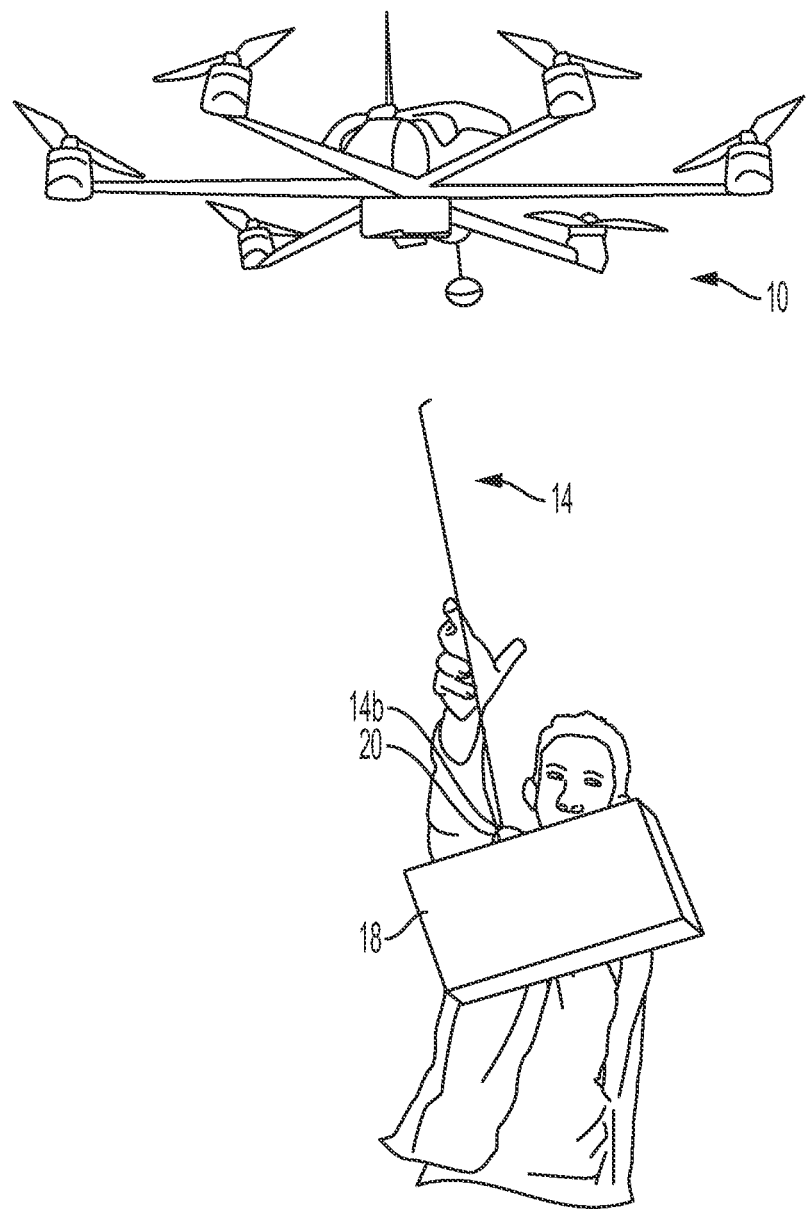
FIG. 2 shows a perspective view of an aerial vehicle, according to an embodiment of the present disclosure.

Referring to FIG. 1, a schematic view of an aerial vehicle 10, such as an unmanned aerial vehicle (UAV) is shown. The aerial vehicle 10 may include a package deployment system 12. The package deployment system 12 may include a lowering line 14, a lowering line spool 16, a line tension monitoring system, a lowering line cutting device, and a spool brake. A package 18 may be secured to the lowering line 14 with a securing point or grasping device 20 (FIG. 2).

The aerial vehicle 10 may carry the package 18 secured to the lowering line 14 at the grasping device 20. The grasping device 20 may be a claw, suction, or other device for grasping or gripping the package 18 and/or a cable, harness, etc. coupled to the package 18. A first end 14a of the lowering line 14 may be fixedly secured to the spool 16 and a second end 14b may be coupled to the grasping device 20. The cutting device (not depicted) may be secured to the spool, the aerial vehicle, or along an upper portion of the lowering line 14. The cutting device may be a scissor, a scissor type device, a piezoelectric cutter, thermal device, laser, blade, other energy devices used to heat an element which cuts the lowering line 14, a resistance based wire element which heats and cuts the lowering line 14, etc., or combinations thereof. Once the aerial vehicle 10 arrives at the delivery location, the aerial vehicle 10 may actuate the cutting device to sever or weaken the lowering line 14 and deliver the package 18.

The cutting device may receive a signal from the aerial vehicle 10 indicating a particular threshold level has been reached thus signaling the cutting device to sever the lowering line 14. The signal received by the cutting device may be indicative of air speed of the aerial vehicle 10, tension on the lowering line 14, distance of the package 18 from a ground or delivery surface, distance of the aerial vehicle 10 from a ground or delivery surface, or combinations thereof. Thus, the threshold level may be a particular air speed, tension, distance, height, or combinations thereof. For example, the aerial vehicle 10 may send a signal to the cutting device that the aerial vehicle 10 is within a predetermined distance, for example, 10 feet, from the delivery surface. At this point, the aerial vehicle 10 may also monitor air speed and prevent or delay actuation of the cutting device if the air speed of the aerial vehicle 10 exceeds a certain threshold, for example, 5 mph. Additionally, or alternatively, the aerial vehicle 10 may monitor tension on the lowering line 14 with a line tension monitoring system. The line tension monitoring system may indicate when a tension on the lowering line 14 is less than a particular threshold, for example 0.1 lbf before actuating the cutting device. Additionally, or alternatively, the aerial vehicle 10 may include two or more altimeters or other sensors. The aerial vehicle 10 may receive signals from both sensors and when the values of both sensors are within the predetermined range, the severing or release of the lowering line 14 may be actuated. The aerial vehicle 10 may send a signal to the cutting device when any combination of these variables is within the predetermined range. The signal may actuate the cutting device.

Any of these monitoring systems may be employed, either alone or in combination, to actuate the cutting device and subsequent delivery of the package 18. The monitoring systems previously described may include one or more of an altitude sensor, altimeter, a tension monitoring system, load cell, airspeed indicator or gauge, sonar, an optical sensor, Lidar, etc., or combinations thereof. The monitoring systems may be provided on the package 18, any component of the package deployment system 12, the cutting device, or the aerial vehicle 10. The monitoring system may include recognition of a barcode on a delivery location.

The monitoring system may be arranged to determine a distance between the package 18 and the ground surface, delivery surface, a kiosk, or a consumer. The monitoring system may employ Real Time Kinematic (RTK) positioning to determine the distance. RTK positioning may use measurements of the phase of the signal's carrier wave (signal of the UAV and/or the delivery location) in addition to the information content of the signal and rely on a single reference station or interpolated virtual station to provide real-time corrections, providing up to centimeter-level positioning accuracy. Alternatively, or additionally, the monitoring system may employ optical sensors to determine the distance. For example, the aerial vehicle 10 may be equipped to take visual pictures of the delivery location. As the delivery location enlarges in the picture, the aerial vehicle 10 may be programmed to determine a relative position based on the size of the delivery location in the picture. For example, if the delivery location is a kiosk, the aerial vehicle 10 may determine the distance to the kiosk based on the size. When the size of the kiosk in the figure matches the predetermined distance for delivery, the package deployment system 12 may be actuated to deploy the package 18.

The package deployment system 12 may allow the natural weight of the package 18 to pull the lowering line 14 toward the delivery surface. The package deployment system 12 and/or lowering line 14 may include a drag mechanism or device (not depicted). The drag mechanism may adjust the tension on the lowering line 14 based on a monitoring of movement of the package 18 and/or aerial vehicle 10 and/or based on a monitoring of the tension on the lowering line 14 during the delivery of the package 18. For example, if the package 18 is falling too fast, the drag mechanism may apply tension to the lowering line 14 to reduce the speed of the package 18. The drag mechanism may include an electric motor and a screw or other drag device. The electric motor may be operated to advance or retract the screw based on whether more or less tension, respectively, is desired. The drag mechanism may allow for controlled descent of the package 18.

The package deployment system 12 may include a parachute (not depicted) coupled to the lowering line 14. The parachute may be coupled to the lowering line 14 adjacent or near the cutting device or adjacent or near the end 14a. In this manner, when the lowering line 14 is cut or severed, the parachute may be located generally at the distal end (near end 14a) of the lowering line 14. In operation, when the cutting device is activated and the lowering line 14 is severed from the spool 16, the lowering line 14 may be begin to fall toward the ground or delivery surface. Where a parachute is included, the parachute may be coupled to the lowering line 14 such that the parachute opens under the force of gravity as the parachute descends. The inclusion of a parachute may cause the rate of decent of the package 18 to be slowed and/or controlled. Alternatively, the parachute may be coupled to the spool 16. Thus, the spool 16 may be released from the aerial vehicle 10 instead of, or in addition to, the severing of the lowering line 14. In this embodiment, the spool 16 may be left behind with the delivered package 18. The spool 16 may be made of a low-cost, biodegradable materials, such as a biodegradable plastic.

Referring to FIG. 2, operation of the aerial vehicle 10 including the package deployment system 12 is shown. The aerial vehicle 10 may be loaded with the package 18 at a home base or warehouse location. To load the package 18, an operator may first secure a package deployment system 12 (FIG. 1), including the spool 16, to the aerial vehicle 10. The operator may then couple the grasping device 20 at the end 14b to the package 18. The operator may then initiate flight of the aerial vehicle 10. The aerial vehicle 10 may adjust the length the lowering line 14 extends from the aerial vehicle 10 before and during flight to accommodate for sway and pendulum effect caused by the dangling package 18. The aerial vehicle 10 may navigate to the delivery location. The delivery location may be a consumer, a residential home, a kiosk, etc.

Upon arrival of the aerial vehicle 10, the monitoring system may signal to the package deployment system 12 various parameters, such as the height of the package 18, the tension of the lowering line 14, and/or the speed of the aerial vehicle 10, as has previously been described. If the sensed parameters are within a predetermine threshold (e.g. a predetermined height from the ground or consumer, tension, speed, etc.), the aerial vehicle 10 may send a signal to the cutting device to sever the lowering line 14 from the spool 16 or to spool and release the lowering line 14 as will be described in FIGS. 3A and 3B. Once severed or released, the lowering line 14 and package 18 are no longer coupled to the aerial vehicle 10. The lowering line 14 and package 18 may descend to the delivery location (e.g. a kiosk, consumer, ground surface, etc.). The package deployment system 12 may continually or intermittently monitor the tension on the remaining portion of the lowering line 14 secured to the spool 16 and send a signal to the aerial vehicle 10 indicating the package has been detached (e.g. when the tension is below a predetermined threshold, such as, for example, 0.1 lbf, indicating the package is no longer suspended from the aerial vehicle 10). A monitoring system may be included with the lowering line 14, grasping device 20, and/or package 18 to monitor when the package 18 has landed at the delivery location. The monitoring system may send a signal to the aerial vehicle 10, a consumer's mobile or computing device, and/or a central command center indicating the package 18 has been delivered.

Alternatively, or additionally the spool 16 may be signaled to release from the aerial vehicle 10. The spool 16 may descend from the aerial vehicle 10 to the delivery surface with the package 18 and lowering line 14 coupled thereto. The spool 16 may include a parachute or similar to control the rate and descent of the package 18. After delivery of the package 18, the monitoring system may signal to the aerial vehicle 10 that the package 18 has been delivered and the aerial vehicle 10 may proceed to a subsequent deliver with a second package deployment system 12 and a second package 18. Alternatively, if the delivery is the only or final delivery, the aerial vehicle 10 may return to the base location or warehouse. After delivery of the package 18 and at the home base location, more lowering line 14 may be spooled from the spool 16 to secure another package thereto. The aerial vehicle 10 may be launched to deliver the additional package(s). The process of returning home and spooling lowering line 14 from the spool 16 may continue until no lowering line 14 remains on the spool 16. At this time, a new spool 16 may be coupled to the aerial vehicle or additional lowering line 14 may be wound onto the spool 16.

Figure 3:
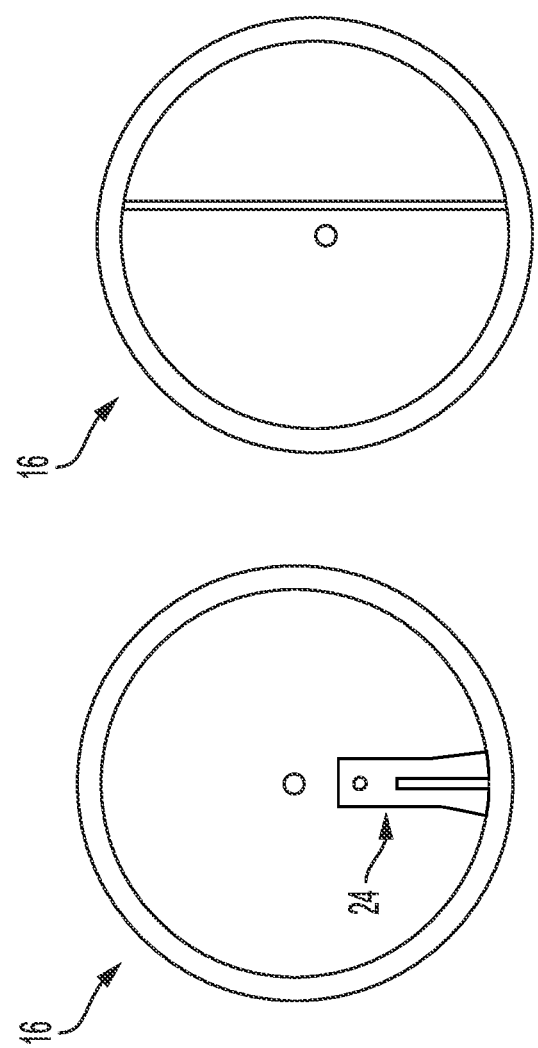
FIGS. 3A and 3B show schematic views of a spool, according to an embodiment of the present disclosure.

Referring to FIGS. 3A and 3B, schematics of the spool 16 having a collet 24 are depicted. In an alternative embodiment, the spool 16 may be preloaded with a particular length of lowering line 14, for example 10 feet. The end of the lowering line 14 may be secured to the spool 16 with the collet 24. Instead of cutting the lowering line 14, as previously described, the spool may continue to spool out the lowering line 14 until the end 14a (FIG. 1) of the lowering line 14 is pulled from the collet 24. Alternatively, the lowering line 14 could be coupled to the spool 16 with other connection types, such as tape or the lowering line 14 could extend through the spool 16. In any of the foregoing embodiments the aerial vehicle 10 may control the speed of unspooling of the lowering line 14. The control of the speed may be based on the monitoring system and/or based on a measuring of the tension on the lowering line 14.

Figure 4:
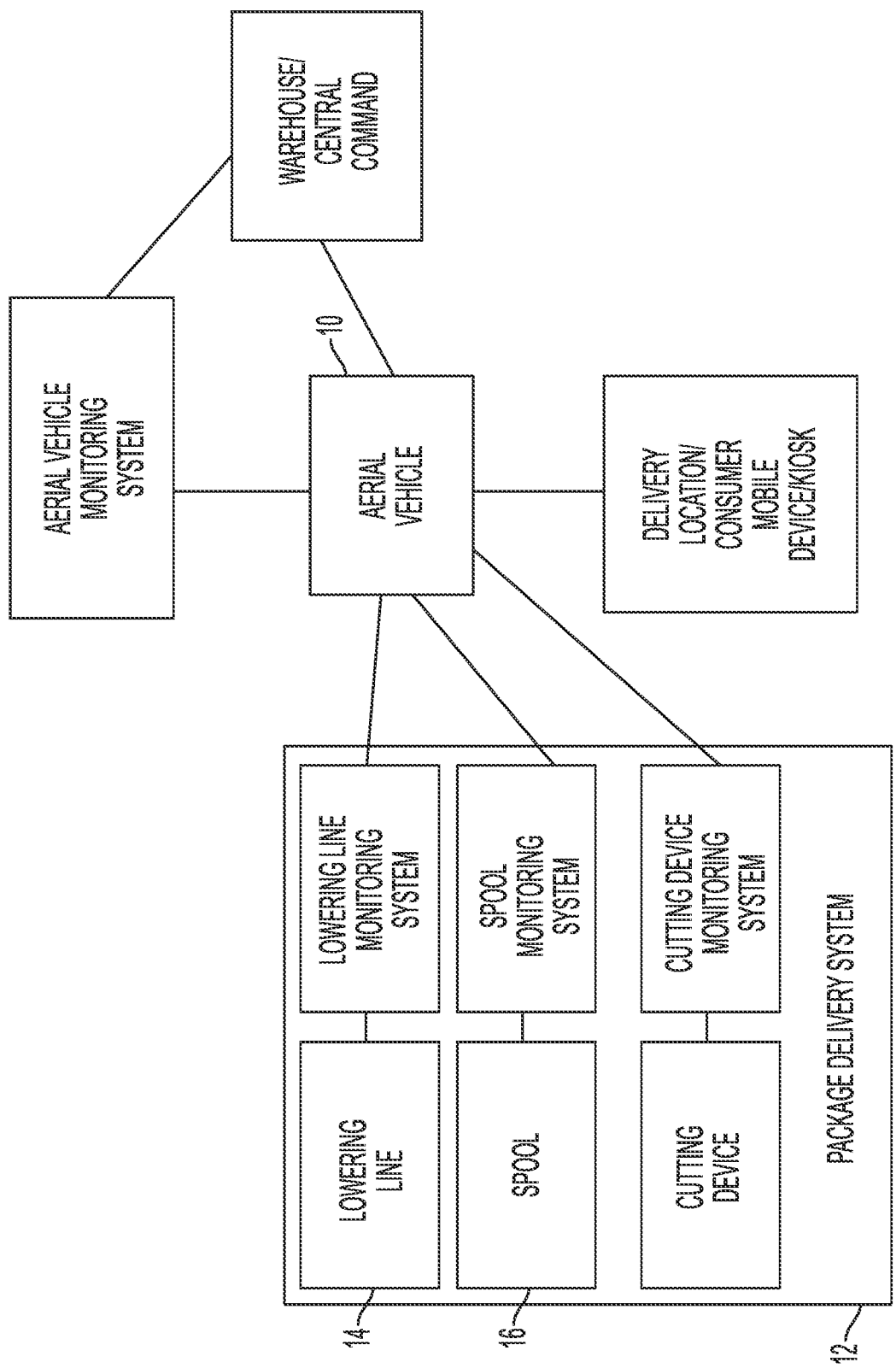
FIG. 4 shows a block diagram of a delivery system for an aerial vehicle, according to an embodiment of the present disclosure.

Referring to FIG. 4, a block diagram of an aerial vehicle 10 and package deployment system 12 is depicted. One or more of the individual components of the package deployment system 12 may include monitoring system(s) and/or sensor(s), as previously described. For example, the lowering line 14 may include a tension monitoring system, a load cell at one or both ends, or other monitoring. The cutting device or spool 16 may include monitoring system(s) to indicate release or actuation of the respective parts. The monitoring systems may communicate with the aerial vehicle 10. For example, the monitoring systems may transmit and/or receive data or signals to and from the aerial vehicle 10. The monitoring systems may transmit information, data, or other signals to the aerial vehicle 10. The aerial vehicle 10 may process the signal and transmit a signal back to the package delivery system and/or components thereof instructing the component to take a particular action or communicate with another component. For example, the aerial vehicle 10 may instruct the component to actuate, as previously described. Once activated, the monitoring systems may transmit a signal to the aerial vehicle 10 to indicate the new status (e.g., the actuated status) of the respective component and/or may communicate updated data or information to the aerial vehicle 10. The monitoring systems may communicate real time with the aerial vehicle 10, the consumer, and/or a central command or warehouse.

The aerial vehicle 10 may communicate with the delivery location, consumer mobile device, and/or kiosk to send and/or receive information or data on package delivery, send or receive instructions on deployment, send or receive instructions of storage, and send or receive confirmation of package receipt. The aerial vehicle 10 may communicate with the warehouse to send and/or receive information on package delivery and send and/or receive confirmation of package receipt.

The package deployment system 12 may be a single deployment system. That is, the package deployment system 12 may deliver a single package 18 in a delivery run of the aerial vehicle 10 and the lowering line 14 may be delivered with the package 18. The lowering line 14 may be a biodegradable plastic or other biodegradable material. If a second package 18 is to be delivered, a second package deployment system 12 include a second spool 16, second lowering line 14, second cutting device, and second grasping device 20 may be provided. In this manner, the aerial vehicle 10 may deliver multiple packages with the same package deployment system 12.

The package deployment system 12 may be modular such that the number of package deployment systems 12 provided on the aerial vehicle 10 may be selected based on the number of packages to be delivered to a particular delivery location or area or on a delivery run of the aerial vehicle 10. Thus, the aerial vehicle 10 may be customized to deliver any number of packages to any number of locations during a single package delivery run. For example, the aerial vehicle 10 may be provided with more than one package deployment system 12 such that more than one package 18 may be delivered in a single delivery run of the aerial vehicle 10.

As an example, the aerial vehicle 10 may be provided with two package deployment systems 12. Each of the package deployment systems 12 may be coupled to a package 18. The aerial vehicle 10 may navigate to a first delivery location and deliver the first package 18 by severing or releasing a first lowering line 14 of the first package deployment system 12 in any of the foregoing manners. The aerial vehicle 10 may then navigate to a second delivery location and deliver the second package 18 by severing or releasing a second lowering line 14 of the second package deployment system 12 in any of the foregoing manners. The aerial vehicle 10 may navigate to the home base or warehouse to be loaded for the next delivery run.

Where multiple package deployment systems 12 are provided, the aerial vehicle 10 may also be provided with a system for correcting or adjusting for the sway or pendulum effect of the packages due to the sudden loss of weight after delivery of a package. For example, the system may include sensors and/or one or more servos for controlling the movement of the package deployment systems 12. The sensors may relay information on pitch, yaw, and/or roll to the package deployment systems 12 causing the package deployment systems 12 and/or components thereof to move about the aerial vehicle 10 to compensate for the change in weight of the aerial vehicle 10 over the course of the delivery run (e.g., due to delivery of packages) and/or to compensate for the changing center of gravity during flight.

The monitoring system of the aerial vehicle 10 may operate during flight of the aerial vehicle 10. If an obstacle is encountered, for example, if the lowering line 14 is snagged or if the aerial vehicle 10 is otherwise compromised, the monitoring system may send a signal to the cutting device or spool 16. The cutting device or spool 16 may release the lowering line 14 and drop the package 18. This may allow the obstacle, snag, or other hang up of the aerial vehicle 10 to be overcome and the aerial vehicle 10 may return to the base location or warehouse for repair or restocking of packages. As an example, if the aerial vehicle 10 reaches a certain tension or speed as sensed by the monitoring system, the lowering line 14, spool 16, or the entire package deployment system 12 may be released from the aerial vehicle 10.

The general autonomous nature of the package deployment system 12 may allow for the aerial vehicle 10 to deliver a package 18 to a delivery location without intervention from an operator or consumer. Thus, the package 18 may be delivered to an unmanned kiosk. The kiosk may be programmed to grasp or capture the package 18 based on signals received from the aerial vehicle 10. Additionally, although described for package delivery, the aerial vehicle 10 and package deployment system 12 may be employed for packaged pick up or receipt. For example, an aerial vehicle 10 with package deployment system 12 may navigate to a consumer. The consumer may couple the package 18 to the package deployment system 12. This may require the consumer's mobile device or computer is able to communicate with the aerial vehicle 10 and/or the package delivery system 12. When the package 18 is secured to the aerial vehicle, the consumer may instruct the aerial vehicle to take the package 18 to the warehouse and/or a return center, where the package 18 may be received and processed, in any of the foregoing manners.

Although the foregoing description is directed to the preferred embodiments of the invention, it is noted that other variations and modifications will be apparent to those skilled in the art and may be made without departing from the spirit or scope of the invention. Moreover, features described in connection with one embodiment of the invention may be used in conjunction with other embodiments, even if not explicitly stated above.

We claim:

1. An aerial vehicle for delivering a package, the aerial vehicle comprising:
    a package deployment system coupled to the aerial vehicle, the package deployment system comprising:
    a spool coupled to the aerial vehicle;
    a lowering line fixedly coupled to the spool at a first end of the lowering line, the lowering line having a second end secured to a grasping device; and
    a cutting device coupled to one of the spool or the lowering line; and
    a monitoring system coupled to one of the aerial vehicle or the package deployment system,
    wherein the monitoring system is configured to:
        monitor a parameter of a component of the package deployment system and delay or prevent actuation of the cutting device if the parameter exceeds a predetermined threshold; and
        determine a distance between a delivery surface of a delivery location and one of the aerial vehicle or the package based on the size of the delivery location in a current figure compared to a figure of a predetermined distance,
    wherein the parameter is an air speed of the aerial vehicle, wherein the package deployment system is configured to deliver the package at the delivery location by actuating the cutting device to sever the lowering line to deliver the package, the severed lowering line having a first portion coupled to the spool and a second portion coupled to the package, and
    wherein the spool is configured to spool the first portion of the lowering line before navigating to another location.

2. The aerial vehicle of claim 1, wherein the monitoring system is further configured to monitor a second parameter and wherein the second parameter is the lowering line tension or load.

3. The aerial vehicle of claim 1, wherein the cutting device is at least one of a scissor, a scissor type device, a piezoelectric cutter, a thermal device, a laser, a blade, an energy device for heating an element which cuts the lowering line, or a resistance based wire element which heats and cuts the lowering line.

4. The aerial vehicle of claim 1, further comprising a parachute coupled to the lowering line at the first end.

5. The aerial vehicle of claim 1, wherein the monitoring system further comprising one or more of an altitude sensor, altimeter, a tension monitoring system, a load cell, an airspeed indicator, an airspeed gauge, sonar, an optical sensor, or Lidar.

6. The aerial vehicle of claim 1, further comprising a second package deployment system, the second package deployment system configured to deliver a second package.

7. A method for delivering a package with an aerial vehicle, the method comprising:
    loading a package on a package deployment system of the aerial vehicle;
    navigating the aerial vehicle to a delivery location;
    monitoring a parameter of the aerial vehicle or the package deployment system;
    determining a distance between a delivery surface of the delivery location and one of the aerial vehicle or the package based on the size of the delivery location in a current figure compared to a figure of predetermined distance;
    severing a lowering line secured to the package into a first portion coupled to the aerial vehicle and a second portion coupled to the package, the severing based on a signal indicative of the parameter being within a predetermined threshold;
    releasing the second portion of the lowering line and the package to be delivered to the delivery location; and
    spooling the first portion of the lowering line before navigating to another location.

8. The method of claim 7, wherein monitoring the parameter comprises monitoring of airspeed of the aerial vehicle, distance between the package and a delivery surface, and tension on the lowering line.

9. The method of claim 7, wherein the parameter is the distance between the package and the delivery surface.

10. The method of claim 7, wherein, subsequent to the steps of claim 9, the method further comprises:
    unspooling lowering line from the spool and securing another packages thereto;
    repeating the steps of loading, navigating, monitoring, severing, releasing and spooling until no lowering line remains on the spool; and
    removing the spool and coupling a new spool to the aerial vehicle or winding lowering line onto the spool.

11. The method of claim 7, wherein the step of loading the package further comprises:

a consumer coupling the delivery package to the package deployment system;

wherein the step of navigating the aerial vehicle to a delivery location further comprises:

using a mobile device to communicate with the aerial vehicle or the package deployment system and instructing the aerial vehicle to navigate to a return center or warehouse location where the package is received and processed.

12. The aerial vehicle of claim 1, wherein the package deployment system is configured to compensate for the change in weight and center of gravity of the aerial vehicle by shifting the position of the package deployment system components relative to the aerial vehicle based on one or more of pitch, yaw, and roll.

13. An aerial vehicle comprising:

a package deployment system coupled to the aerial vehicle, the package deployment system comprising:

a spool coupled to the aerial vehicle;

a lowering line fixedly coupled to the spool at a first end of the lowering line, the lowering line having a second end secured to a grasping device;

a monitoring system coupled to one of the aerial vehicle or the package deployment system; and wherein the monitoring system is configured to:

monitor a parameter of a component of the package deployment system and delay or prevent actuation of a releasing device if the parameter exceeds a predetermined threshold and determine a distance between a delivery surface of a delivery location and one of the aerial vehicle or the package based on the size of the delivery location in a current figure compared to a figure of predetermined distance, and wherein the parameter is an air speed of the aerial vehicle.

14. The aerial vehicle of claim 13, wherein the releasing device is configured to deliver the package by releasing the spool from the aerial vehicle.

15. The aerial vehicle of claim 14, wherein a parachute is coupled to the spool and configured to control the rate of decent of the spool.

16. The aerial vehicle of claim 14, wherein the spool is made of biodegradable material.

17. The aerial vehicle of claim 13, wherein the package deployment system is further configured to deliver the package at the delivery location by preloading the spool with a predetermined length of lowering line; and wherein the spool is configured to unspool the lowering line until the first end of the lowering line is no longer coupled to the spool.

18. The aerial vehicle of claim 17, wherein the first end of the lowering line is secured to the spool with a collet.

* * * * *